Nov. 22, 1955 C. W. BRANDON 2,724,357
BARGE TRIM ADJUSTMENT FOR CONFINED VOLATILE FLUIDS
Filed April 7, 1949 5 Sheets-Sheet 1
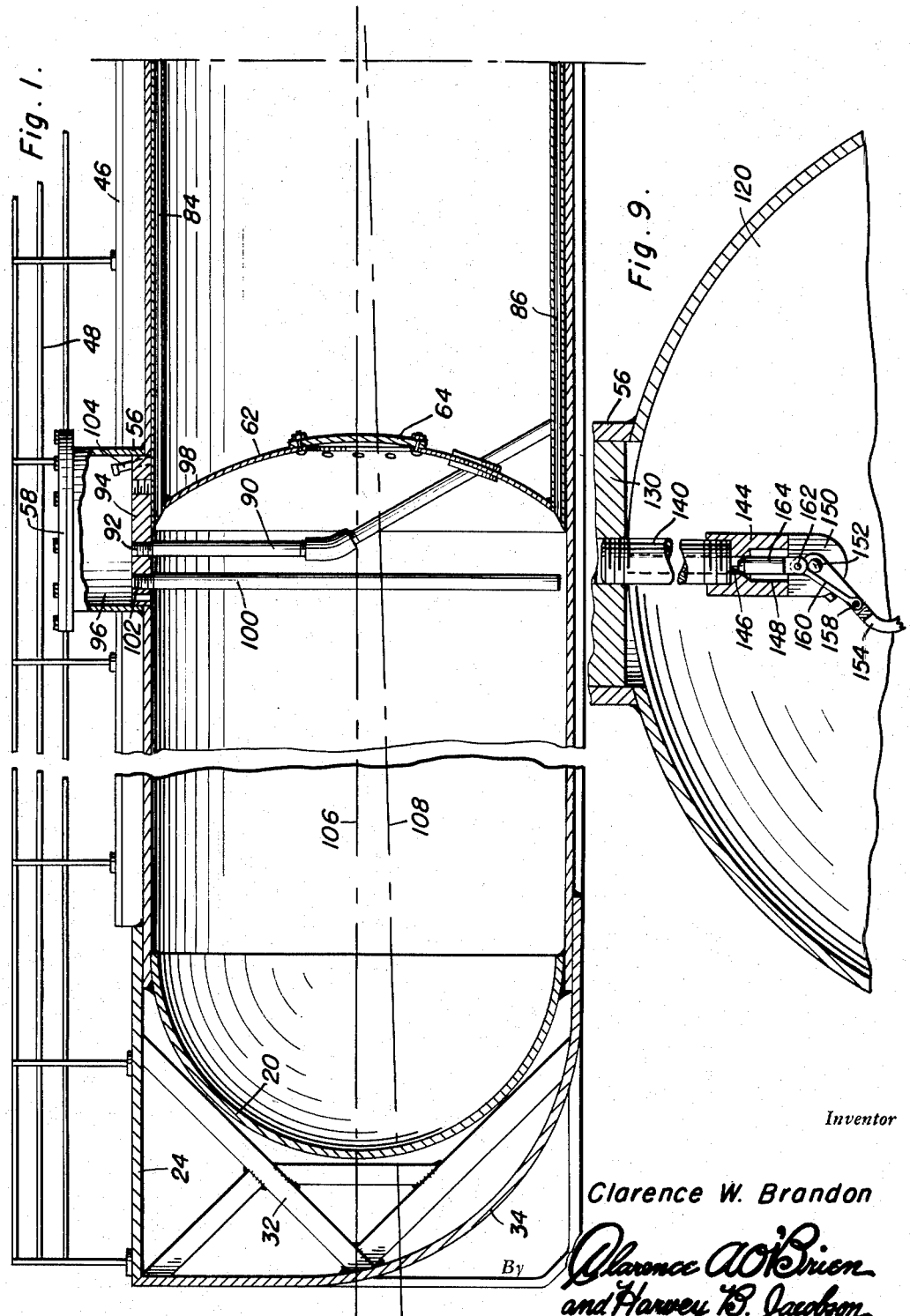
Inventor
Clarence W. Brandon
By Clarence A. O'Brien
and Harvey B. Jacobson
Attorneys

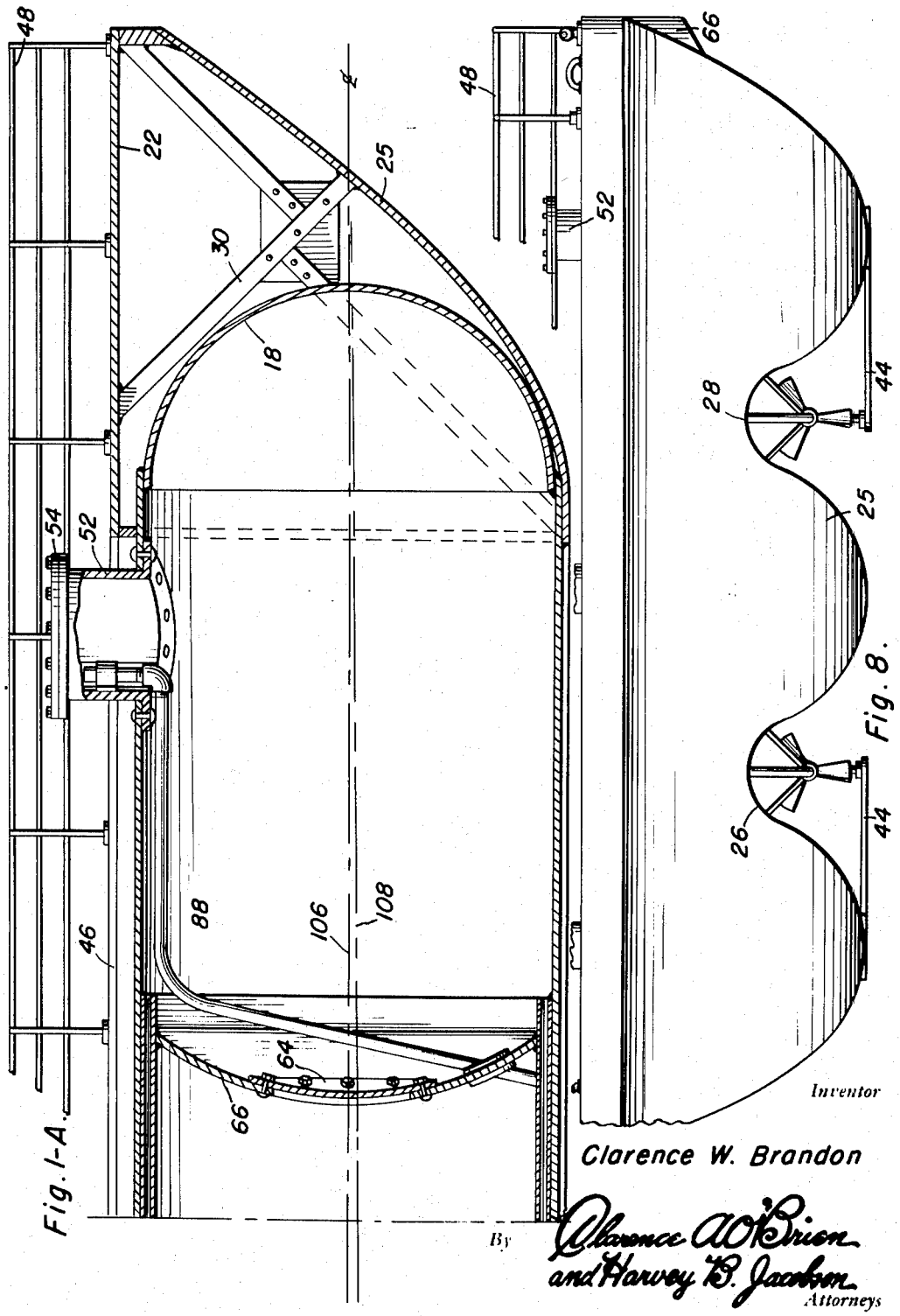

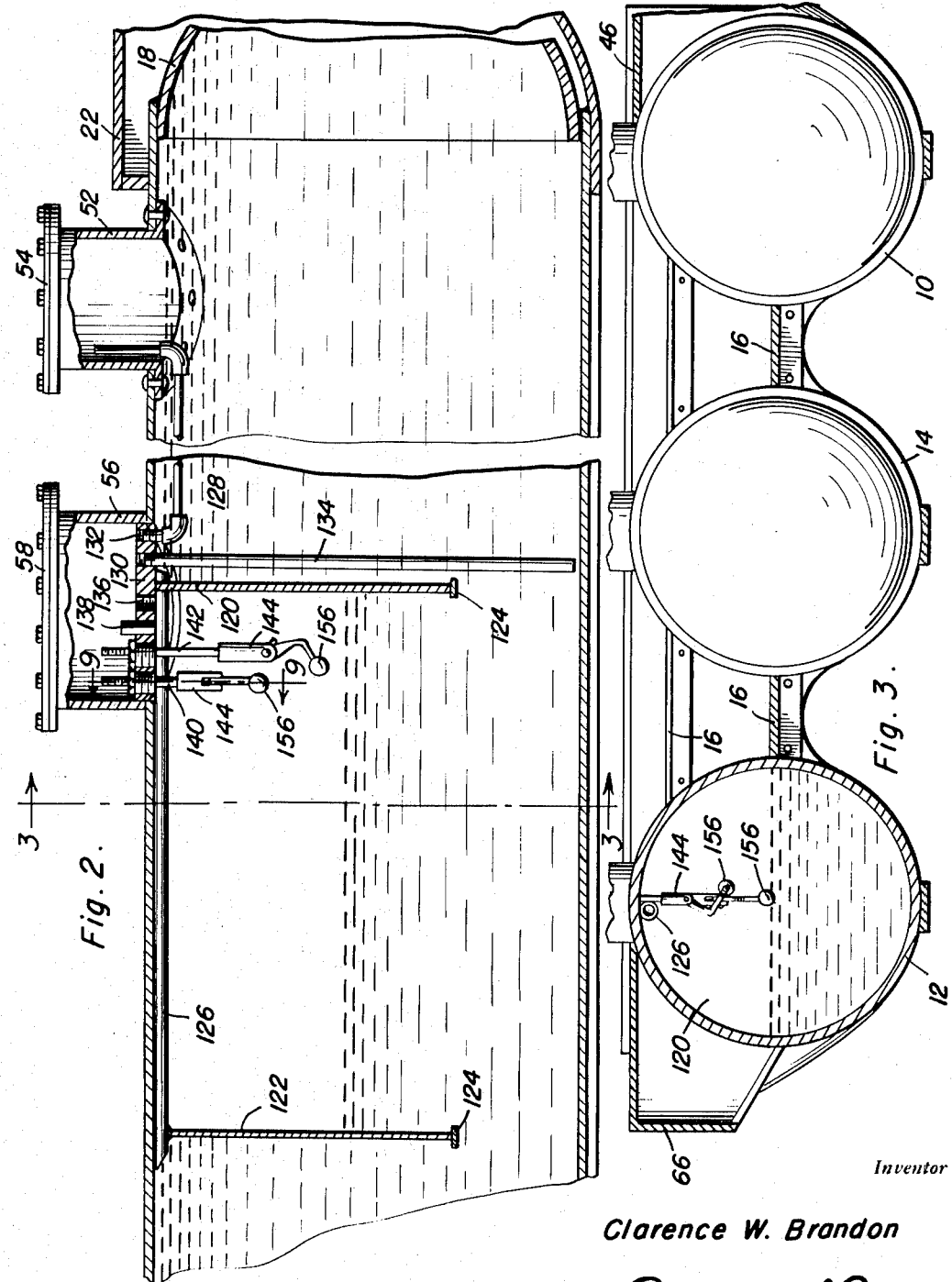

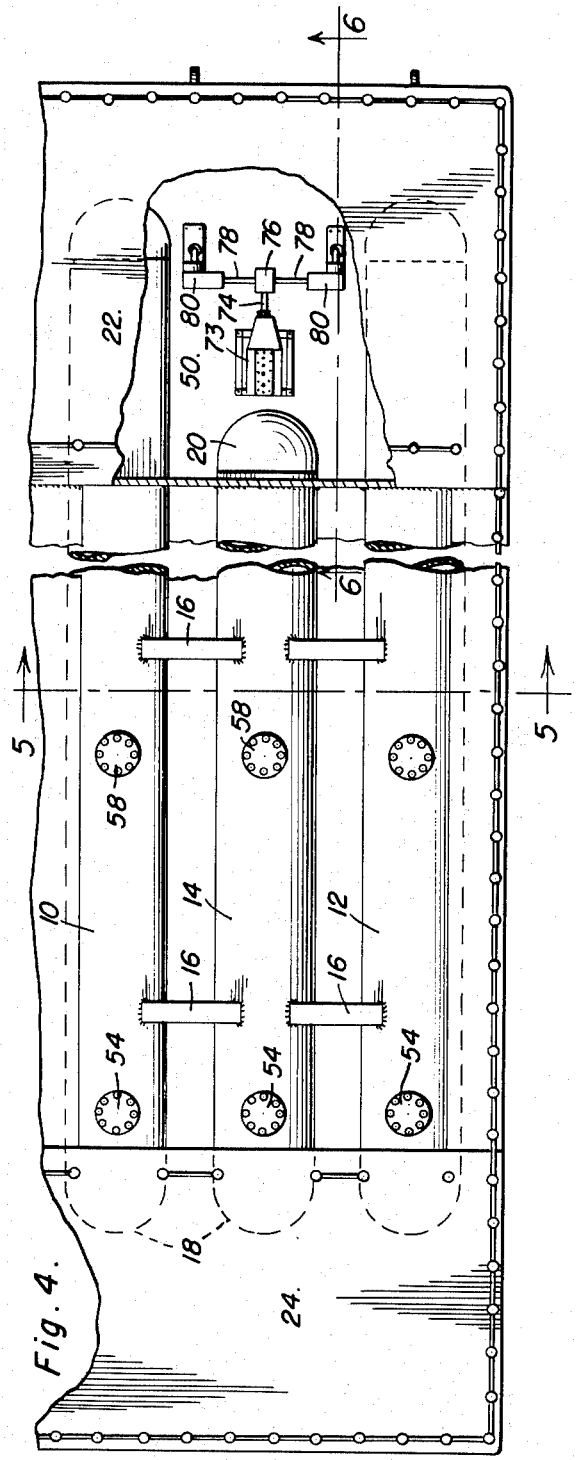
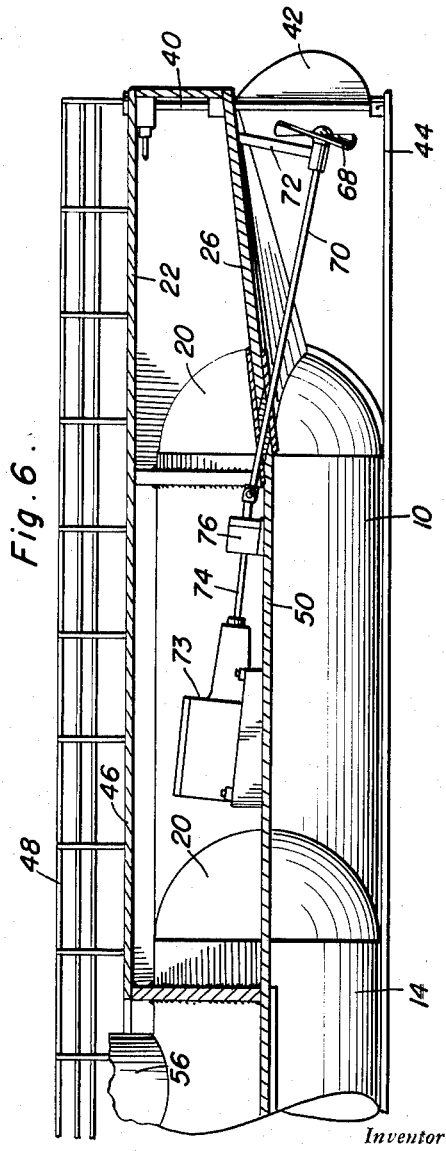
Inventor
Clarence W. Brandon

Nov. 22, 1955  C. W. BRANDON  2,724,357
BARGE TRIM ADJUSTMENT FOR CONFINED VOLATILE FLUIDS
Filed April 7, 1949  5 Sheets-Sheet 5
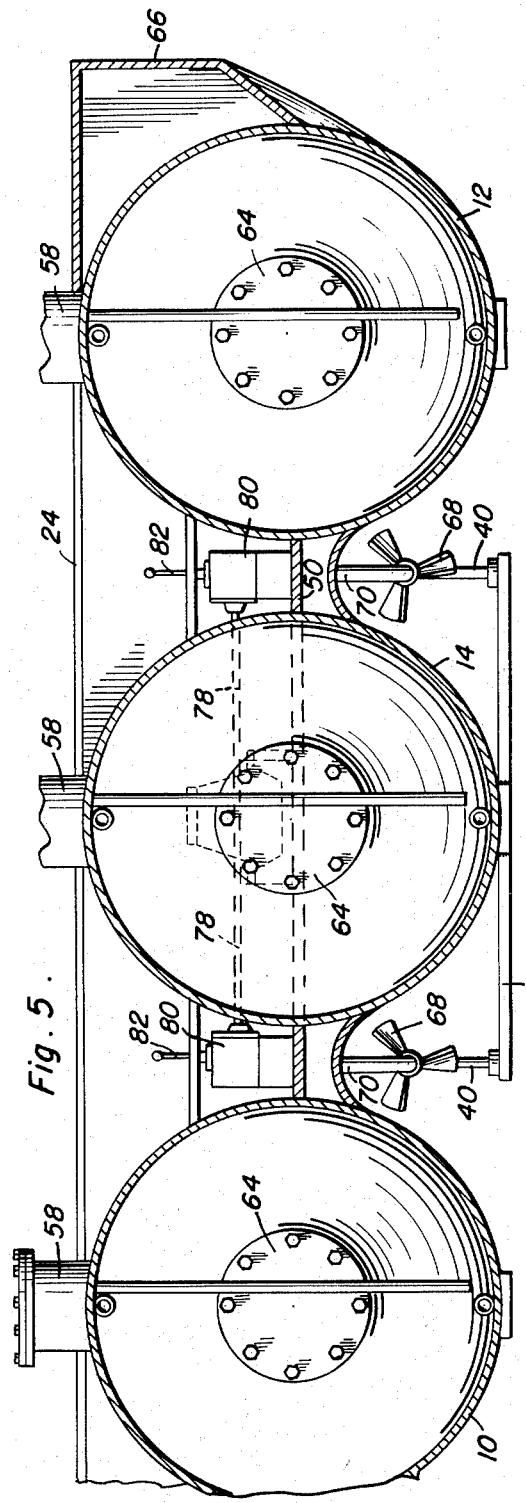
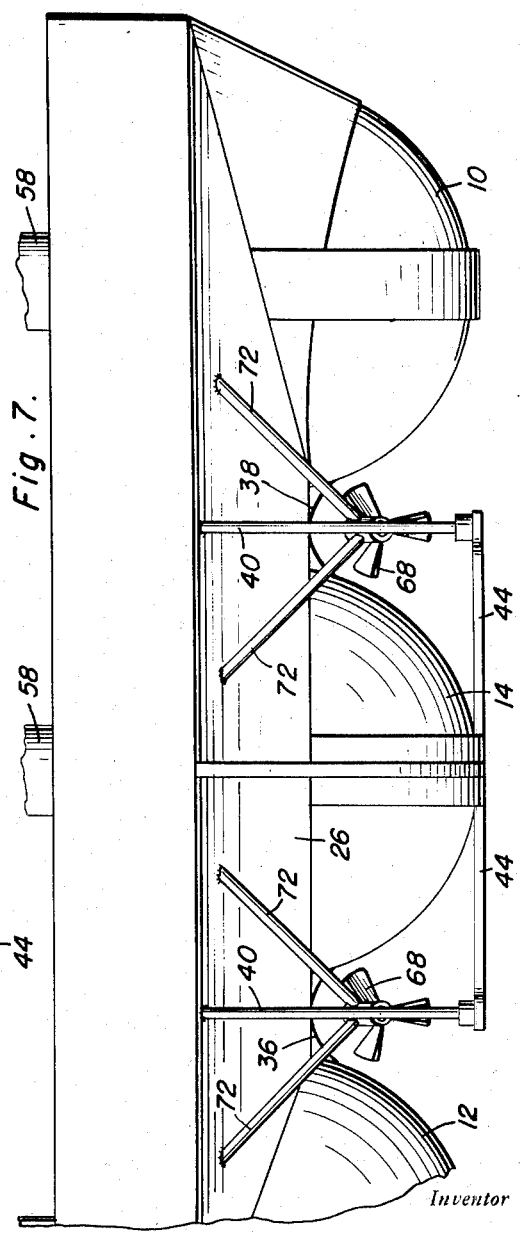
Inventor
Clarence W. Brandon
By Clarence A. O'Brien
and Harvey B. Jacobson
Attorneys

United States Patent Office 2,724,357
Patented Nov. 22, 1955

2,724,357

BARGE TRIM ADJUSTMENT FOR CONFINED VOLATILE FLUIDS

Clarence W. Brandon, Tallahassee, Fla., assignor, by direct and mesne assignments, of fourteen and one-sixth per cent to N. A. Hardin, fourteen and one-sixth per cent to Hazel H. Wright, fourteen and one-sixth per cent to Catherine H. Newton, all of Forsyth, Ga., and fifteen per cent to Harvey B. Jacobson, Washington, D. C.

Application April 7, 1949, Serial No. 86,032

17 Claims. (Cl. 114—74)

This invention comprises novel and useful improvements in a multiple unit, self-trimming barge for volatile liquids, and in general comprehends apparatuses and methods for the storage, cooling and transportation of volatile liquids and other fluids. More specifically, it comprises a plurality of tanks rigidly secured together with prow and stern assemblies to form a barge, which tanks are each internally subdivided into a plurality of compartments together with suitable fluid connections between the various compartments within each tank for maintaining the trim of the barge during and to facilitate loading and unloading.

This application contains subject matter which is similar to that set forth in a prior patent to Clarence W. Brandon and George M. Brandon, No. 2,408,505, my copending application, Serial No. 39,154, filed July 16, 1948 which on September 21, 1954 issued as Patent No. 2,689,461, and my copending application, Serial No. 74,546, filed February 4, 1949, and it further includes improvements over said prior patent and copending applications.

As set forth in detail in my above referred to copending applications, the industry of storing and transporting liquified volatile fluids, particularly such as ammonia, butane, and propane, has long recognized that the basic difficulties to be overcome arise from the necessity of maintaining the confined volatile fluids at a sufficiently low temperature to prevent their absorption of heat and concomitant internal temperature and pressure rises, with the mechanical problems associated therewith.

Moreover, in that branch of the industry concerned with the marine transportation of such fluids, it has been well known that shallow draft barges are necessary for use on coastal and inland waterways; but that the necessity for shallow draft in conjunction with the preceding difficulties has heretofore prevented the construction of commercially practical inland barges which were also seaworthy.

Still further, in coastal shipping particularly, the above difficulties are accompanied and augmented by the problem of maintaining the barge in trim while loading or unloading and especially while loading or discharging portions of its contents during its voyage.

It is, therefore, the primary object of this invention to provide an improved barge and an improved method for transporting, storing, and/or refrigerating volatile liquids, such as propane, butane, ammonia, and the like.

A very important object of this invention is to effectively unite a plurality of separate fluid storage tanks in rigid, spaced assembly with respect to each other, to form in their entirety a durable and seaworthy barge.

A still further extremely important object of the invention is to provide a multiple unit barge wherein various predetermined portions of the liquid cargo of the barge may be discharged or loaded selectively without adversely affecting the trim of the barge.

A very important feature of the invention resides in the assemblage of three or more volatile liquid-containing tanks disposed in rigid, spaced, side-by-side relation, with prow and stern assemblies applied thereto to form a seaworthy barge.

An additional feature of the invention consists in providing one or more partitions in each of the tanks to divide the same into two or more storage compartments, whereby each tank will be provided with a liquid storage compartment and a combined liquid and vapor receiving compartment, which latter admits of expansion and contraction of the liquid contents of the barge while retaining all of the volatile vapors of the confined volatile liquid.

Still another feature of the invention resides in the provision of a compartmented barge, suitable for the transportation and storage of volatile liquids under pressure, wherein the requisite strength is retained but the weight is lessened by balancing the pressures to which partitions are subjected.

Another important feature of the invention comprises the utilization of a center of gravity such that when substantially empty the central longitudinal axis of the barge will lie in a horizontal plane or may lie in a plane inclined downwardly and backwardly of the barge with respect to the horizontal plane to facilitate the substantially complete emptying of the barge; while, when substantially loaded, the longitudinal central axis will be in a plane inclined with respect to the horizontal plane, so that the barge in navigational trim will be lower at its stern.

And a final and very important feature of the invention includes the provision of a novel method for easily, efficaciously and quickly loading or unloading a barge consisting of a plurality of storage chambers, without detrimentally affecting the trim of the barge during the loading or unloading, and while maintaining a predetermined vapor pressure upon the volatile liquid within the barge between predetermined maximum and minimum limits.

These, together with various ancillary features and objects of the invention which will later become apparent as the following description proceeds, are attained by the present invention, preferred embodiments of which have been illustrated by way of example only in the accompanying drawings, wherein:

Figures 1 and 1a are, respectively, stern and prow portions of a vertical central longitudinal sectional view through one embodiment of a barge tank constructed in accordance with this invention;

Figure 2 is a fragmentary vertical central longitudinal sectional view, similar to that of Figures 1 and 1a, through another embodiment of barge tank in accordance with this invention;

Figure 3 is a vertical transverse sectional view taken substantially upon the plane of the section line 3—3 of Figure 2, parts being broken away and parts omitted to simplify the illustration;

Figure 4 is a top plan view, parts being broken away, of a barge which may be formed from the tank embodiments of either Figures 1 and 1a or Figure 2 in accordance with this invention;

Figure 5 is a vertical transverse sectional view, parts being broken away, taken substantially upon the plane of the section line 5—5 of Figure 4;

Figure 6 is a fragmentary vertical longitudinal sectional view taken substantially upon the plane of section line 6—6 of Figure 4 and illustrating, in particular, the arrangement of the power plant, the stern assembly, and one of the driving propellers of the barge;

Figure 7 is a stern elevational view, parts being broken away, of the barge illustrated in Figure 4;

Figure 8 is a front elevational view, parts being broken away, of the barge illustrated in Figure 4; and Figure 9 is a fragmentary vertical transverse sectional detail view taken substantially upon the plane of the section line 9—9 of Figure 2.

Reference is now made more particularly to the accompanying drawings showing various embodiments of the invention and wherein like numerals designate similar parts throughout the various views.

I.—Hull construction

While the above identified copending applications disclose barges for transporting volatile liquids, which barges consist of two or more separate tanks rigidly attached together, the present invention relates to further specific constructions of the individual tanks and novel means for rigidly connecting and associating the same. An essential principle of the embodiments disclosed herein is that the barge tanks are so compartmented and interconnected that varying quantities of the liquid cargo may be loaded or withdrawn as required without deleteriously affecting the navigational trim of the barge.

Referring now first to Figure 4, and in conjunction with Figure 3, the embodiment of barge illustrated will be found to consist of a pair of outside tanks 10 and 12 which are preferably of identical constructions and dimensions, rigidly attached to an intermediate tank 14 as by any suitable bracing struts or the like 16. It is preferred to form the intermediate tank of a different length than the outside tanks, so that the front ends of the series of tanks may be coextensive or lie in the same transverse vertical plane, but the rear end of the intermediate tank will terminate forwardly of the rear ends of the outside tanks to provide a space therebetween which is utilized for purposes hereinafter set forth.

Of course, the intermediate tank could be of the same length as the outside tanks if desired, and its forward end and rear end could both be disposed in advance of the corresponding ends of the outside tanks. In addition, while in the simplest embodiment the intermediate tank is of the same diameter as the outside tanks, and has its upper and lower surface disposed in the same horizontal planes as the corresponding surfaces of the outside tanks, it will be readily apparent that it is possible to form the inner tank of a diameter either greater than or less than the outside tanks; and/or to position the intermediate tank with its upper and lower surfaces above and/or below the corresponding surfaces of the outer tanks, if desired.

The tank units of the hull of the barge, as will be clearly apparent from Figures 1 and 1a, are provided with hemispherical or convexed forward and rear ends 18 and 20, respectively, in order to better adapt the tanks to withstand the internal pressures developed by their liquid cargo, and in particular the widely varying and extreme pressures developed by such volatile liquid cargoes as propane, butane, ammonia, and the like.

In a similar manner to that disclosed in my above identified copending applications, prow and stern assemblies are secured to and mounted upon the forward and rearward ends of the hull tank units. The prow and stern assemblies include horizontally extending deck plates 22 and 24, respectively, see Figures 1a and 1, respectively, which extend across the entire series of tank units and are rigidly attached thereto as by welding or the like.

These deck plates 22 and 24 extend beyond the ends and laterally of the tank units, as will be seen in Figure 4. The prow assembly includes a bottom wall 25 which slants downwardly and backwardly from its forwardmost edge to be joined and secured to the forward end of the tank units. As will be seen by reference to Figure 8, the forward lower edge of the prow assembly is scalloped at its lower edge to provide a contour corresponding to the cross-sectional contour of the assembled tank units of the barge, thus defining openings 26 and 28 which constitute the forward ends of tunnels which extend between the tank units the full length of the barge and to some extent perform the functions of keels as well as constituting propeller receiving tunnels as set forth in detail in my copending application, Serial No. 74,546, and as referred to hereinafter.

Suitable bracing, as indicated at 30, is provided for giving the necessary rigidity to the prow assembly, similar bracing 32 being employed in the stern assembly. The stern assembly includes a downwardly and forwardly extending end and bottom wall and plate 34 which is likewise rigidly secured, as by welding, to the rear ends of the tank units, the stern assembly, as shown in Figure 8, being similarly provided with scalloped portions 36 and 38 forming the rear or exit ends of the longitudinally extending tunnels with which the prow portions 28 and 26 are respectively associated.

Rudder posts 40 are suitably mounted in the stern assemblies and extend downwardly through each of the longitudinally extending tunnels and have mounted thereon for movement in said tunnels, rudders 42, the rudder posts being controlled with any suitable and known mechanism, not shown. As will be seen, the lower ends of the rudder posts 40 are supported upon suitable plates 44 secured to the bottom surfaces of the tanks.

Although the same is not absolutely essential, it is preferred to provide a complete deck structure 46 suitably supported upon and mounted above the tank units and connecting the prow and stern deck plates 22 and 24. Hand or guard rails 48 will preferably be mounted upon the deck structure 46 about the periphery thereof.

As will be best seen by reference to Figures 4 and 6, a horizontally disposed plate 50 is provided between the rear ends of the two outside and the intermediate tanks and is rigidly secured to the surfaces of these tanks at substantially the vertical mid-point thereof, this plate being appropriately positioned for connection with the bottom plate 26 of the stern assembly. The plate 50 provides a deck or support which may be conveniently employed for mounting the propulsion engines, the power plant, cabins, storage rooms, and the like, for the barge.

Preferably adjacent its forward end, each of the tank units is provided with a control hatch 52, having covers 54 by means of which access may be had to the interior of the tank unit for inspection, servicing or repairs.

Preferably adjacent the rear ends of the tanks, additional hatches 56 having removable covers 58 are provided for obtaining access to various valves, gauges, liquid and vapor conduits and the like with which the tank units are provided, as set forth hereinafter.

In the embodiment shown in Figures 1 and 1a, each of the tank units is divided by forward and rearward partition members 60 and 62 into an intermediate chamber and a pair of end chambers. These partition plates are preferably curved or dished in order to withstand the variation in pressure to which they are subjected, as well as to permit expansion and contraction of the metal plates forming the tank units, and are conveniently provided with removable manhole covers 64 by means of which workmen entering the forward compartment or chamber through the hatch 52 may obtain access to the intermediate and to the rear chamber of the tank unit.

As in my preceding copending applications, sponsons or blisters may be provided upon the side surfaces of the tanks for imparting buoyancy thereto, increasing stability and the like; and, similarly, lateral fenders 66 may also be employed. Also, as set forth in detail and claimed in my preceding application, Serial No. 74,546, filed February 4, 1949, insulating means may be provided upon any desired portions of the tanks of the barge.

A propeller 68, carried by a propeller shaft 70 supported by a propeller shaft hanger 72, is positioned in each of the longitudinally extending tunnels inwardly of the rudders 42, the shaft 70 extending through suitable stuffing boxes, not shown, through the bottom wall 26 of the stern assembly and to the space above the horizontal deck 50. These shafts 70 are connected to a power plant of any desired character, such as that indicated at 73, which is mounted upon the deck plate 50, as shown best in Figures 4 and 6. The power plant 73 is provided with a driving shaft 74 which extends into a gear box 76 to drive laterally extending power shafts 78 which, in turn, enter gear boxes 80, see Figure 5, in which they are connected with the propeller shafts 70. The gear casings 80 are provided with manual control levers 82 by means of which the individual propeller shafts may be selectively disconnected from the driving shafts 78, or operated in relatively reverse directions in order to facilitate the steering and maneuvering of the barge when negotiating the restricted channels of inland waterways, canals, or the like.

II.—Tank compartmental construction

Two general modified constructions of tank compartments are illustrated in the drawings, that disclosed in Figures 1, 1a, and that illustrated in Figure 2. The former construction divides the interior of each of the tank units into three compartments by means of partition bulk heads 60 and 62, which thus prevent free communication between the compartments; while the latter construction likewise divides the interior of each tank into three compartments, but the dividing partitions or bulk heads are preferably open at their lower ends, to thus provide a continuous but restricted communication between the compartments.

Reference is made first to the arrangement of Figures 1 and 1a. The upper and lower portions of the forward and rearward compartments are placed in free and continuous communication by means of vapor and liquid equalizing conduits 84 and 86, respectively, which extend through the partitions 60 and 62 so that the front and rear compartments perform functionally as a single chamber.

A conduit 88 is positioned in the forward compartment and has its upper end terminating within the hatch 52 which, being at the highest point of the forward compartment, constitutes a vapor collecting chamber therein, while the lower end of the conduit 88 extends through the partition member 60 adjacent its lower end and opens into the interior of the intermediate chamber closely adjacent to the bottom thereof.

A conduit 90 whose lower end extends through the partition 62 into the intermediate tank adjacent the lowermost portion thereof is connected at its upper end, as by means of screw threads, with a bore 92 extending through a bottom or closure plate 94 for the hatch 56. A pair of screw-threaded bores 96 and 98 extend through the plate 94 to connect the interior of the hatch 56 with the rear compartment and with the intermediate compartment, respectively. A further conduit 100 screw-threadedly engages a bore 102 in the bottom or closure plate 94, and in its lower end communicates with the rear compartment adjacent the lowermost surface thereof. Suitable tubular fittings 104 are provided whereby gauging means may be inserted into the intermediate or the rear compartments for gauging or indicating the liquid levels and/or the liquid contents thereof.

In loading this embodiment, when the tank is substantially empty, the liquid cargo is supplied by means of the hatch 56 to the inlet end of the conduit 100 into the rear compartment, from which, by means of the equalizing conduits 84 and 86, it fills both front and rear compartments equally and at the same rate. When these compartments are filled, continued inflow of liquid passes by conduit 88, following the previously expelled vapor from the front compartment, into the middle compartment. By properly controlling the escape of vapor from the vent 98, any desired vapor pressure may be attained in the intermediate tank, it being understood that the incoming liquid compresses the vapor in the space above the same, whereby the intermediate tank functions as a combined vapor and liquid pressure storage and expansion chamber. When it is desired to discharge all or a major part of the contents of a tank, the foregoing operation is reversed. The valve means, not shown, controlling the upper end of the conduit 100 is opened whereby the pressure maintained upon the liquid cargo discharges the fluid from the system of compartments. Additional vapor is forced in through the vent 98 to maintain this pressure.

By means of the conduit 90, liquid may also be directly supplied to and withdrawn from the intermediate tank, any necessary vapor pressure adjustment being effected through the vent 98. During this operation, it is preferred to maintain the end compartments completely filled with liquid.

The foregoing arrangement conforms admirably to the requisites for discharging and loading varying partial cargoes. When it is desired to discharge a quantity less than that contained in the middle compartment or to introduce a quantity thereinto, this may be effected by proper control of the conduit 90 and vent 98 without disturbing the contents of the end compartments. If a quantity is to be unloaded greater than that contained in the intermediate compartment, the same will be withdrawn from conduit 100. Thus, fractional parts of the cargo may be removed or added without appreciably varying the trim of the tank.

Moreover, during the loading or unloading operations above mentioned, the lighter ends of the entire cargo which are present in the vapor of the intermediate compartment are retained, thus preventing a loss which is not only expensive but may detrimentally affect the trim and balance of the barge.

It is preferred to fill the front and rear tanks completely with liquid and to maintain them full at all times, while the intermediate tank is partially filled with liquid to varying levels not exceeding a predetermined maximum and constitutes the expansion chamber and vapor chamber for the three tank compartments. By means of suitable control valves, not shown, the various vents may then be closed and the tank unit will then be sealed and ready for navigation. The variations in volume and pressure created by the change in temperatures of the liquid cargo, which variations are especially pronounced in the two completely filled end compartments, are afforded relief by means of the conduit 88, since the solid confined liquids of the front and rear compartments, which are in continuous communication by means of the conduits 84 and 86, may overflow into the intermediate compartment upon expansion of the liquid, and may be returned upon contraction of the same in a manner which will be readily apparent.

As in the various specific arrangements set forth in my preceding applications, this necessary expansion or overflow of the volatile liquid may be utilized to produce a refrigerating action upon the liquid itself, thereby diminishing the pressure, temperature and volume changes of the liquid cargo.

It should be particularly noted that by proper manipulation of the vents through their respective valves, that the entire liquid cargo of a tank may be maintained at substantially any desired pressure; and that varying liquid levels may be maintained in the intermediate tank compartment. Further, this arrangement lends itself admirably to the maintaining of separate vapor or expansion spaces in the intermediate compartment and in the two end compartments which operate as a unit by means of their equalizing conduits 84 and 86, if the same is found to be desirable or necessary.

Indicated at 106 is the longitudinal geometric axis or center line of a tank unit when the latter is empty, while the line 108 indicates the position the longitudinal axis will assume when the barge is fully loaded. The line 106 may coincide with the horizontal plane or, if desired, the barge may be so constructed as to position the line 106 at a slight inclination to the horizontal plane.

A very important advantage of this construction is that various predetermined portions of the liquid cargo of the barge may be discharged without adversely affecting the trim of the barge. Thus, in a three-tank unit barge having nine compartments, it is possible, without detriment to the barge trim, selectively to discharge a part or substantially all of the contents of the intermediate compartment of the middle tank; or the intermediate compartments of the two outside tanks; or the front and rear compartments of either the middle tank or the two outside tanks. This permits a proper balancing of the remaining cargo by appropriately selecting the tank compartments to be all or partially discharged, and the same provision would apply for taking on additional cargoes. Thus, the barge is ideally adapted to make a series of deliveries and take on a series of cargoes during one navigational run or trip, obviously minimizing the cost of handling or operating the barge, all while maintaining the vessel in a seaworthy condition and without impairing its navigability.

In the preceding elucidation, it has been considered that the intermediate compartment constituted the expansion chamber while the two end compartments comprised the liquid storage chambers. Obviously, however, the structure is capable of a reversed arrangement. By making the necessary vapor and liquid connections between the compartments, the middle compartment can constitute the liquid storage chamber while the end compartments will function as the expansion chambers. The operation in the loading and discharging of this reversed arrangement is similar to that set forth above.

Attention is directed next to the modified construction of Figures 2, 3 and 9. In this embodiment, each of the tank units is provided with a pair of partitions 120 and 122 which are secured to the sides and upper portion of the inside wall of the tank unit to depend therefrom, the lower edges of these partitions terminating above the bottom of the tanks, as at 124, to thereby provide a continuous communication between the forward, rear and intermediate compartments of the tank. A conduit 126 extends through the partitions 120 and 122 to connect the upper portions of the front and rear compartments for equalizing the flow of vapor therebetween. As will be seen, the lower portions of the front and rear compartments are in communication with each other and with the central compartment by means of the openings beneath the lower edges 124 of the two partitions.

A vapor and overflow and loading and unloading conduit 128 has its inlet end extending into the forward hatch 52 constituting a vapor collection chamber for the same purpose as the conduit 88 of the arrangement of Figures 1 and 1a; while the other end of this conduit extends through the bottom or closure plate 130 of a hatch 56, being engaged in a screw-threaded bore 132 therethrough, for establishing communication with the interior of the hatch 56. Preferably, the hatch 56 overlies the partition 120 so that the same communicates with both the forward and intermediate compartments, as shown in Figure 2.

A conduit 134 extends through a suitable screw-threaded bore in the plate 130, and its lower end discharges into the forward tank adjacent the bottom thereof.

Likewise extending through the bottom plate 130 is a screw-threaded bore 136 constituting a vent for the intermediate compartment, and by means of the conduit 126 and the conduit 128 for the front and rear compartments, this vent 136 being adapted for control by any suitable fitting, not shown. A further fitting 138 extends through this plate for the reception of any suitable gauging means whereby the contents of the liquid tank may be gauged.

A further pair of conduits 140 and 142 are adjustably vertically slidable in stuffing boxes through the plate 130, and at their lower ends are provided with float valve controlled fittings 144 of the construction shown in Figure 9. The fittings are adapted to control the application of vapor pressure of the expansion compartment to an automatic signalling and loading control referred to hereinafter and are disposed at appropriate levels at which it is desired to maintain or to fill the intermediate compartment of the tank with various liquids, the conduit 140 and its fitting being appropriately positioned for filling the tank with butane, while the conduit 142 and its fitting are intended to maintain the proper liquid level for propane.

It should be recognized that the automatic loading and unloading means disclosed in my copending application, Serial No. 74,546, above mentioned, may be employed for connection with the conduits 140 and 142 in order to load or unload the barge tank automatically and with accuracy.

At this point, it should be recognized that the float controlled valves of the fittings 144 could likewise be applied to the embodiment of Figures 1 and 1a, for automatically controlling the loading and unloading of the compartmented tanks.

Referring now more particularly to Figure 9, it will be seen that the fitting 144 constitutes a casing which is screw-threadedly engaged upon the lower end of the conduit 140, this casing having a passage 146 communicating with the interior of the conduit with which the fitting is associated, and with an enlarged bore 148 at the lower and bifurcated end of the casing which opens between a pair of lugs 150. Extending between the lugs 150 is a pivot pin 152 upon which is journaled one end of a lever 154 whose other extremity is provided with a weighted float 156, see Figure 2. Intermediate its ends, the lever 154 is pivoted as at 158 with a link 160 whose other end is pivoted, as at 162, to a valve member 164 slidingly received in the bore 148 and operatively engageable with a valve seat formed in the outer end of the bore 146. The arrangement is such that the weight of the float normally holds the valve closed as shown in Figure 9. As the float rises, the lever arm 154, link 160 and valve 164 reach a position of alignment when the valve will be open. At this time, the desired liquid level is attained, and the vapor pressure is employed, through lines 140 or 142, to actuate a signal, or the automatic loading or discharging control mechanism set forth in my application 74,546. This period of valve opening and of this actuation is of brief duration, since further upward movement of the float moves the lever and link into a reverse position, again closing the valve. The position of the valve fitting can be adjusted to control different liquid levels by the vertical adjustment of the conduits 140, 142 in their bores in member 94.

The operation of this embodiment in its loading and unloading operation, and in the self-trimming of the barge is identical with that set forth in the preceding embodiment. However, in this form, it will be noted that the manhole covers 64 are unnecessary, since access may be had from the forward compartment beneath the edges 124 of the two partitions to the other two compartments. Moreover, in filling this barge, the liquid fluid supplied through the conduit 134 will maintain a common level in each of the three compartments until this level reaches above the lower end of the edges 124 of the partitions.

At this time, the compartments are sealed or separated from each other at their upper ends with the liquid closing the lower ends thereof, and further introduction of liquid forces the vapor from the front compartment through the conduit 128 into the hatch 56, and from the rear compartment through the conduit 126 and through the conduit 128, while compressing the vapor in the intermediate compartment. As in the preceding embodiment, proper regulation of the vent valve and/or operation of the float controlled valves will serve to provide a vapor space in the intermediate compartment with a resultant pressure of any predetermined amount.

As in the preceding construction, it is preferred to maintain the front and rear compartments completely filled with liquid to serve as storage chambers, while the middle compartment functions as an overflow and pressure chamber. However, the overflow into the middle compartment resulting from expansion of the contents of the storage chambers is effected beneath the lower edges 124 as is its return flow.

When fluid is withdrawn from a tank by the conduit 134, the front compartment depleted thereby is replenished by flow from the middle compartment, the vapor pressure therein being augmented or maintained through the vent 136.

It is also possible to reverse this arrangement, in the same manner described with respect to the arrangement of Figures 1 and 1a, so that the storage compartment is provided by the intermediate compartment with the end compartments composing the overflow and expansion chambers.

In each of the embodiments, it is to be understood that baffles or surge plates may be suitably mounted in the interior of the various compartments for preventing sudden surging of the fluid from one end of the barge to the other with a disadvantageous effect on the trim or center of gravity of the barge.

All of the arrangements referred to hereinbefore disclosed two basic embodiments of tanks each having three longitudinally spaced compartments. The principles of this invention are clearly not restricted to the number of compartments, however. It will be evident that the greater the number of compartments, the greater the flexibility and variability of the quantity of the partial loadings and discharges of the cargo are possible without impairing the trim of the barge.

Nevertheless, while for practical reasons three compartments are deemed to be generally preferable, it is also entirely feasible to obtain the desideratum of this invention by using tanks having but a single partition and thus forming only two compartments. In this third of the basic embodiments, the partition constructions and associated vapor and liquid connections of the two preceding basic embodiments may be employed. From the purely practical aspect, however, it seems essential in maintaining the requisite buoyancy of the barge to provide the more buoyant expansion and overflow chamber in the front compartment and the liquid storage chamber as the rear compartment.

The proportioning of the tank volume between these two compartments can be widely varied.

In all of the embodiments, the partitions 60, 62, 120, 122 may be formed of relatively thin, light weight and inexpensive material compared to that of the tank shell, since the pressures on both sides of each partition are balanced or equalized.

It should be here recognized that in the forms of the invention associated with Figures 1 and 1a and in the corresponding two-compartment construction, the flow of fluid between the storage and expansion chambers may be utilized to effect a refrigerating action upon the liquid cargo to minimize excessive temperatures and pressures by means of any of the methods and apparatuses disclosed in detail and claimed in my copending applications mentioned above.

III.—Method

The foregoing construction of tanks and compartments permit the employment of a novel method of loading and emptying; and of partially discharging and augmenting the cargo of the barge while maintaining a desired trim substantially unaltered.

Substantially all liquefied petroleum gases, ammonia and the like are not available in commercial quantities in the pure state but are mixed with appreciable quantities of lighter fractions which are not liquefiable at those pressures at which the heavier fractions, forming the main bulk of volatile liquid, are customarily handled. Therefore, an appreciable, if not a major portion of the vapor allowable above confined volatile liquids consists of these lighter fractions.

In present practice, when a tank is emptied, these lighter fractions are permitted to remain, to prevent the admittance of air to the tank, and the next quantity of volatile liquid introduced into the tank compresses these fractions into the allowable. When the volatile liquid expands, such expansion is permitted by the compressibility afforded by these lighter fractions, which otherwise serve no useful purpose.

The instant invention employs these lighter fractions for the novel and useful purpose of maintaining liquid storage compartments completely filled with volatile liquid and substantially free of lighter fractions. The latter condition has the desideratum that there is no shifting center of gravity of this portion of the cargo under rolling of the container; and the cargo is more stable in that the more easily vaporized fractions are eliminated from the liquid storage chambers.

In accordance with this method, when a barge of the type disclosed in Figures 1 and 1a is to be loaded, the fluid loading and vapor vent lines with which the barge dock or loading station is equipped are connected, respectively, with the loading conduit 100 and the vents 96 and/or 98. The liquid cargo is then pumped into the barge tank, the vapor therein being expelled through the vapor lines and recovered.

What may be regarded as the first or preferred manner of loading, in conformity with this method, consists in closing conduit 90 and vent 96, and in opening vent 98. The volatile liquid is then introduced by the conduit 100 and by means of the liquid and vapor connections 84 and 86 will simultaneously and equally fill both the front and rear storage compartments completely. As the storage compartments fill, the vapor therein is completely expelled through conduit 84 and overflow conduit 88 into the expansion chamber; and vapor is released through vent 98 to provide a controlled vapor pressure. In this manner, the storage tanks will be completely filled with liquid, and it will be noted that during this filling the weight is equally distributed at both prow and stern, thus maintaining fore and aft trim.

As the introduction of liquid continues, the expansion chamber is now filled from the overflow pipe 88, driving out the displaced vapor as above mentioned. When a desired liquid level has been attained in the expansion chamber, the vent is closed either manually or by automatic means and the allowable therein contains the aforesaid lighter fractions. Further introduction of liquid now compresses the vapor to the desired degree, whereupon the loading conduit is closed, the dock lines disconnected, the hatch cover 58 closed and sealed, and the tank is ready for transportation. The lighter fractions, forming the allowable, now maintain the liquid storage compartments completely filled while permitting an overflow from the latter upon expansion. This manner of loading is customarily employed when the tank is substantially empty. The term "allowable" as employed in the art relating to the storage and handling of volatile liquids designates that portion of the container which receives the vapor phase of the volatile liquid; or the vapor phase of the volatile liquid.

A second or alternative manner of loading may conveniently be employed, particularly when the storage compartments are full and the expansion chamber is only partially depleted. The dock lines are connected to the loading conduit 90 and the vent 98 and the requisite liquid introduced and vapor withdrawn.

In each of the two modes of loading described above, it is intended that the barge shall be maintained upon an even keel by simultaneously and uniformly loading tanks on opposite sides of the longitudinal axis of gravity of the barge. Thus, the middle tank can be loaded either separately or with the adjacent outer tanks; but the two latter must be loaded together.

As previously described, the barge, when empty, will have its longitudinal axis on or slightly inclined with respect to a horizontal plane. As the barge is loaded, its center of gravity changes so that the stern sinks lower than the prow, and the longitudinal axis is now considerably inclined to the horizontal plane. There is relatively little rise or fall of the prow from the empty to the fully loaded condition. The barge, upon loading, thus automatically attains its navigational trim. This manner of maintaining the trim of the barge is also used for unloading the same. It will further be seen that any desired list can be easily attained by properly loading the expansion chambers of the two side tanks.

The foregoing modes of loading are also obviously equally applicable to the previously mentioned reversed arrangement wherein the storage compartment is at the middle and the expansion chambers at the front and rear ends of the tanks.

This method of loading and unloading will next be considered as applied to the embodiment of Figure 2. The dock liquid supply and vapor lines are respectively connected with the loading conduit 134 and overflow conduit 132. Since the "allowable," that is, the necessary volume for vapor, is less for butane than for propane, the float controlled valve fitting of the line 140 is placed higher than that of the line 142. Both fittings and lines are usually present so that the barge tank can be immediately used for either volatile liquid.

Fluid is then introduced by conduit 134, the displaced vapor being expelled through conduit 132. The liquid evenly fills all three compartments until its level rises above the lower edges 124 of the partitions 120 and 122. It should be here noted that the clearance between the edges 124 and the bottom of the tank is sufficiently small, so that no major or disproportionate shifting of the center of gravity of the tank will be experienced from the free access of the liquid to the rear compartment.

When the liquid level rises above the edges 124, the vapor is now trapped in the three compartments. As the liquid level continues to rise, vapor in the rear compartment passes into the front compartment by conduit 126; and is discharged from the latter into hatch 56 by conduit 128. The vapor lines from the dock will, of course, lead off the vapor from 128. Any excessive vapor pressure in the expansion chamber is relieved by 136.

After all vapor is expelled from the liquid storage chambers, the vent 136 from the expansion chamber is controlled to obtain the desired "allowable" for the particular volatile liquid being loaded, either by manual adjustment or automatically, as set forth in my above identified copending applications.

For unloading, the reverse of the above procedure occurs, liquid being withdrawn through 134 while the vapor-pressure is maintained by the introduction of vapor through the vent 136.

In the third embodiment of tank construction, that is, the two-compartmental tanks, each of the two manners of loading above described is applicable. However, in this embodiment, with the expansion chamber forward and the storage chamber rearward, it is possible to vary the relative inclination of the longitudinal axis with reference to the horizontal plane. Thus, if the expansion chamber is lightly loaded, the prow will be most buoyant and the inclination will be at its maximum; while when the expansion chamber is fully loaded, the prow will be least buoyant and the inclination will be at a minimum.

It should be here noted that if either the middle or the outside tanks are of this third embodiment while the other tanks or tank is of either the first or second embodiments, it will be possible not only to adjust the list of the barge but also the inclination of its longitudinal axis relative to the horizontal plane.

From the foregoing, the method and apparatus of the invention will now be apparent and further explanation is considered unnecessary. Since numerous changes falling within the spirit of the invention may readily be made, the invention is not to be limited to the exact constructions and methods disclosed herein, but all suitable modifications and equivalents may be resorted to falling within the scope of the appended claims.

Having described the invention, what is claimed as new is:

1. A barge trim adjusting arrangement for storing confined volatile fluids under pressure, comprising a hull consisting of a pair of tanks rigidly connected together in spaced side-by-side relation in a generally horizontal plane, each tank being sealed from the atmosphere for confining a volatile fluid under pressure, at least one of said tanks having a transverse partition therein extending entirely across the tank and providing a liquid storage chamber for receiving a volatile fluid in its liquid phase on one sde of the partition and an expansion chamber on the other side of said partition for receiving said fluid in both its vapor and liquid phases, passage means establishing communication between the lower portions of said chambers whereby fluid will be conducted to the expansion chamber, connecting means communicating with the upper portions of said chambers during loading and means normally closing said connecting means whereby flow between the chambers is restricted to said passage means to retain the storage chamber normally filled with fluid in its liquid phase and thereby control the trim of the barge.

2. A barge trim adjusting arrangement for storing confined volatile fluids under pressure, comprising a hull consisting of a pair of tanks rigidly connected together in spaced side-by-side relation in a generally horizontal plane, each tank being sealed from the atmosphere for confining a volatile fluid under pressure, at least one of said tanks having a pair of longitudinally spaced, transverse partitions therein extending entirely across the tank and providing longitudinally spaced chambers, said chambers including a pair of expansion chambers for receiving said fluid in both its vapor and liquid phases and a liquid storage chamber intermediate said expansion chamber for receiving volatile fluid in its liquid phase, passage means establishing communication between the lower portions of said storage chamber and said expansion chambers whereby said fluid will be conducted to the expansion chambers, connecting means communicating with the upper portions of the storage chamber during loading and means normally closing said connecting means whereby flow between said chambers is restricted to said passage means to retain the storage chamber normally filled with volatile fluid in its liquid phase and thereby control the trim of the barge.

3. A barge trim adjusting arrangement for storing confined volatile fluids under pressure, comprising a hull consisting of a central tank and a pair of adjacent tanks on opposite sides of said central tank, said tanks being rigidly connected together in spaced side-by-side relation in a generally horizontal plane, each tank being sealed from the atmosphere for confining a volatile fluid under pressure, at least one of said tanks having a pair of longitudinally spaced, transverse partitions therein extending entirely across the tank and providing longitudinally spaced chambers, said chambers including a pair of storage chambers for receiving a volatile fluid in its liquid phase and an expansion chamber intermediate said storage chambers for receiving said fluid in both its vapor and liquid phases, passage means establishing communication between the lower portion of said storage chambers and said expansion chamber whereby fluid will be conducted to the expansion chamber, connecting means communicating with the upper portions of the chambers during loading, and means normally closing said connecting means whereby flow between said chambers is restricted to said passage means to retain the storage chambers normally filled with volatile fluid in its liquid phase and thereby control the trim of the barge.

4. A method for controlling the trim of a barge having at least one expansion and one storage chamber, each sealed from the atmosphere and positioned forwardly and rearwardly with respect to each other in the barge, and for storing confined volatile fluids therein under pressure; comprising confining under pressure in said chambers a volatile fluid subject during normal operation of the barge to change in condition between liquid and vapor phases, to variation of the total mass of fluid in said combined storage and expansion chambers and to variation in mass in the respective chambers, maintaining the storage chamber substantially completely filled with said volatile fluid in its liquid phase and restraining the volatile fluid in the expansion chamber in both its vapor and liquid phases throughout changes in the proportion of said phases and mass therein whereby said changes in proportion and mass in said expansion chamber become effective as a trimming moment on the barge.

5. A barge trim adjusting arrangement for storing confined volatile fluids under pressure, comprising a hull consisting of a central tank, a pair of tanks rigidly connected to the opposite sides of the central tank in spaced side-by-side relation, each tank being sealed from the atmosphere for confining a volatile fluid under pressure, each tank of the pair of tanks having a transverse partition therein extending entirely across the tank and providing a liquid storage chamber for receiving a volatile fluid in its liquid phase on one side of the partition and an expansion chamber on the other side of the partition for receiving a volatile fluid in both its vapor and liquid phases, passage means for each of said pair of tanks establishing communication between the lower portions of the chambers therein whereby fluid will be conducted to the expansion chamber, connecting means for each tank communicating with the upper portions of the chambers of their respective tanks during loading and means normally closing said connecting means whereby flow between said chambers is restricted to said passage means to retain the storage chamber normally filled with fluid in its liquid phase and thereby control the trim of the barge.

6. A barge trim adjusting arrangement for storing confined volatile fluids under pressure, comprising a hull consisting of a central tank, a pair of tanks rigidly connected to the opposite sides of the central tank in spaced side-by-side relation, each tank being sealed from the atmosphere for confining a volatile fluid under pressure, each tank of the pair of tanks having a pair of transverse partitions therein extending entirely across the tanks and providing longitudinally spaced chambers, said chambers including a pair of expansion chambers for receiving a volatile fluid in both its vapor and liquid phases and a storage chamber intermediate said expansion chambers for receiving volatile fluid in its liquid phase, passage means for each of said pair of tanks establishing communication between the lower portions of said storage chamber and said expansion chambers whereby said fluid will be conducted to the expansion chambers, connecting means for each of said pair of tanks communicating with the upper portions of the storage chamber during loading and means normally closing said connecting means whereby flow between said chambers is restricted to said passage means to retain the storage chamber normally filled with volatile fluid in its liquid phase and thereby control the trim of the barge.

7. A barge trim adjusting arrangement for storing confined volatile fluids under pressure, comprising a hull consisting of a central tank, a pair of tanks rigidly connected to the opposite sides of the central tank in spaced side-by-side relation, each tank being sealed from the atmosphere for confining a volatile fluid under pressure, each tank of the pair of tanks having a pair of transverse partitions therein extending entirely across the tanks and providing longitudinally spaced chambers, said chambers including a pair of storage chambers for receiving a volatile fluid in its liquid phase and an expansion chamber intermediate said storage chambers for retaining volatile fluid in both its vapor and liquid phases, passage means for each of said pair of tanks establishing communication between the lower portions of said chambers therein whereby fluid will be conducted to the expansion chamber, connecting means for each of said pair of tanks communicating with the upper portions of chambers of their respective tanks during loading and means normally closing said connecting means whereby flow between said chambers is restricted to said passage means to retain the storage chambers normally filled with volatile fluid in its liquid phase and thereby control the trim of the barge.

8. The combination of claim 5 wherein the pair of tanks have at least one end of each extending beyond the adjacent end of the center tank, each tank of said pair of tanks having one of its chambers in its extending end.

9. The combination of claim 6 wherein the pair of tanks have at least one end of each extending beyond the adjacent end of the center tank, each tank of said pair of tanks having an expansion tank in its extending end.

10. The combination of claim 6 wherein the pair of tanks have at least one end of each extending beyond the adjacent end of the center tank, each of said pair of tanks having a storage chamber in its extending end.

11. The combination of claim 5 wherein the pair of tanks have at least one end of each extending beyond the adjacent end of the center tank, each of said pair of tanks having one of said chambers in its extending end, and the other of said chambers being positioned in the other end of said tank.

12. The combination of claim 6 wherein the pair of tanks have at least one end of each extending beyond the adjacent end of the center tank, each of said pair of tanks having said expansion chambers being disposed in each of the ends thereof.

13. The combination of claim 6 wherein the pair of tanks have at least one end of each extending beyond the adjacent end of the center tank, each of said pair of tanks having said storage chambers being disposed in each of the ends thereof.

14. The combination of claim 1 wherein said partition terminates above the bottom of the tank and constitutes said passage means.

15. The combination of claim 1 including additional means for supplying fluid to and withdrawing fluid from said one of said pair of chambers, said last means communicating with the interior of the tank solely through the expansion chamber.

16. The combination of claim 2 including additional means for supplying fluid to and withdrawing fluid from said one of said pair of tanks, said last means communicating with the interior of the tank solely through one of the expansion chambers of said tank.

17. The combination of claim 3 including additional means for supplying fluid to and withdrawing fluid from said one of said pair of tanks, said last means communicating with the interior of the tank solely through said expansion chamber.

References Cited in the file of this patent

UNITED STATES PATENTS

| Number | Name | Date |
| --- | --- | --- |
| 255,599 | Coppin | Mar. 28, 1882 |
| 1,054,490 | Barnaby | Feb. 25, 1913 |
| 1,358,081 | Kennedy | Nov. 9, 1920 |
| 1,518,263 | Keates | Dec. 9, 1924 |
| 1,759,644 | Reed-Hill | May 20, 1930 |
| 2,346,505 | Preuss | Apr. 11, 1944 |
| 2,363,177 | Haffner | Nov. 21, 1944 |
| 2,408,505 | Brandon et al. | Oct. 1, 1946 |
| 2,435,332 | Van Vleet et al. | Feb. 3, 1948 |
| 2,487,863 | Garretson | Nov. 15, 1949 |

FOREIGN PATENTS

| Number | Country | Date |
| --- | --- | --- |
| 16,720 | Great Britain | July 17, 1912 |
| 24,981 | Austria | July 25, 1906 |
| 194,238 | Great Britain | Mar. 8, 1923 |
| 695,908 | France | Oct. 6, 1930 |